March 7, 1967 F. L. ROSE ET AL 3,307,389

SURGICAL INSTRUMENT

Filed May 28, 1964 2 Sheets-Sheet 1

FRANK L. ROSE
TIMOTHY A. BRENNAN
*INVENTORS*

BY

FRANK L. ROSE
TIMOTHY A. BRENNAN
*INVENTORS*

BY Alden D Redfield
Abraham Ogman

United States Patent Office 3,307,389

Patented Mar. 7, 1967

3,307,389

SURGICAL INSTRUMENT

Frank L. Rose, Reading, and Timothy A. Brennan, Andover, Mass., assignors, by mesne assignments, to Tracor Inc., Austin, Tex., a corporation of Texas Filed May 28, 1964, Ser. No. 370,912
10 Claims. (Cl. 72—410)

This application relates to surgical instruments and, in particular, to a semiautomatic dispenser of surgical clips such as is generally described in the Rose et al. patent, 3,075,199.

It is an object of this invention to provide an improved semiautomatic clip dispenser which includes all of the advantages of the device described in the Rose et al. patent and, in addition:

(1) uses casting techniques for constructing its three principal parts, thereby greatly reducing its cost of manufacture; and (2) makes it possible to reduce the number of disposable parts to a minimum, namely, the clip-retaining wheels.

In accordance with the invention, a surgical clip dispenser comprises a frame which includes actuating means for dispensing a surgical clip. The clip dispenser also includes a hub assembly mounted in a slider. The hub assembly is rotatable about its own axis and linearly reciprocable with the slider. The hub assembly comprises a pair of spaced discs joined by an equilateral polygonal hub. The external surface of one of the discs contains equally-spaced radial projections which coact with a finger secured to the frame to rotate the hub in response to a reciprocating movement of the hub assembly and slider.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
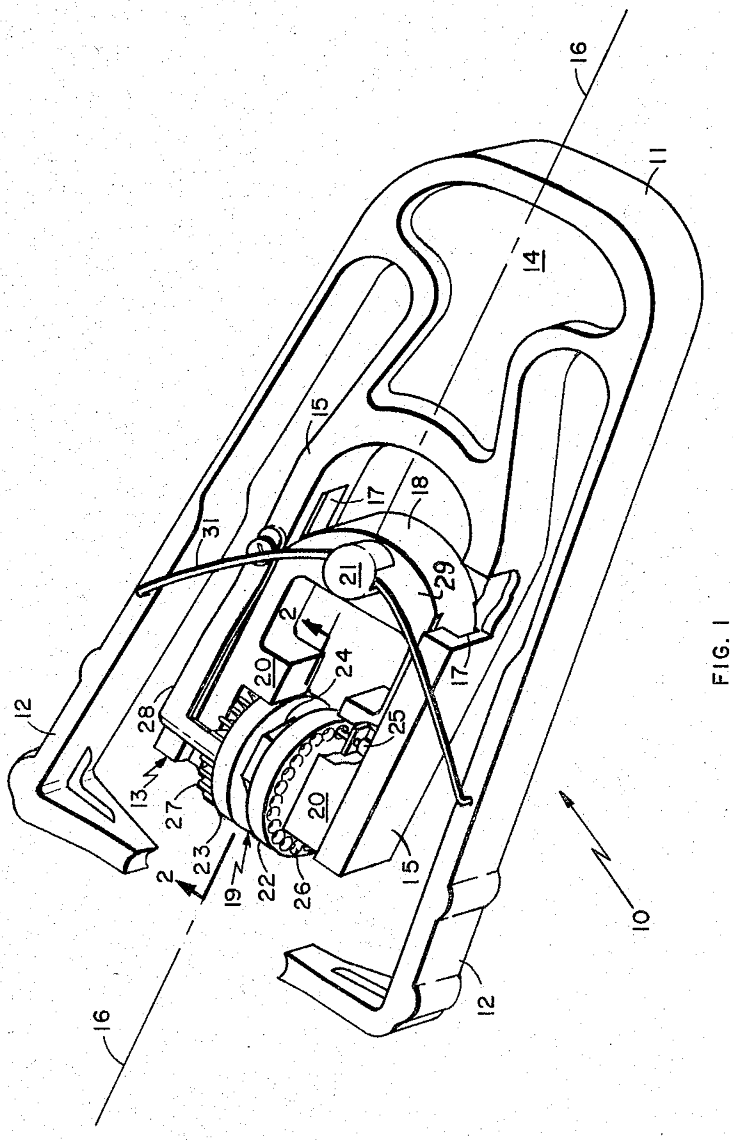
FIGURE 1 is an isometric top view of a surgical clip dispenser embodying the principles of the present invention.
Figure 2:
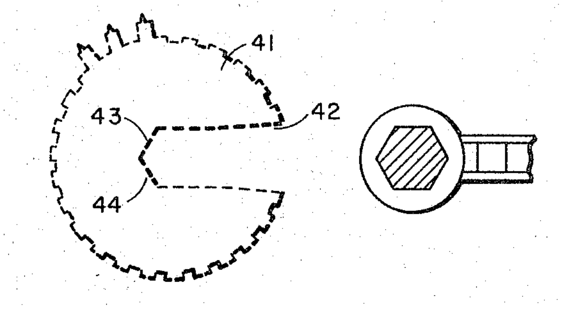
FIGURE 2 is a sectional view of the hub assembly taken along lines 2—2 to illustrate the equilateral polygonal construction of the hub.

Referring to FIGURES 1 and 2 in particular, there is represented a surgical clip dispenser 10. The surgical clip dispenser 10 comprises a frame 11 which includes a pair of actuating arms 12, a U-shaped slider support 13 and a rear portion 14. The assembly is symmetrical about a longitudinal axis 16. The actuating arms 12 are equally spaced from the axis 16 and joined, preferably integrally, to the rear portion 14. The slider support 13 contains a pair of recessed channels 17 with confronting openings.

The surgical clip dispenser 10 also includes a slider 18 which is generally U-shaped. A hub assembly 19 containing spaced arms 15 and 20 is rotatably mounted at the open end of the slider 18. A transverse apertured pin 21 is formed on the bight 29 of the slider 18.

Figure 3:
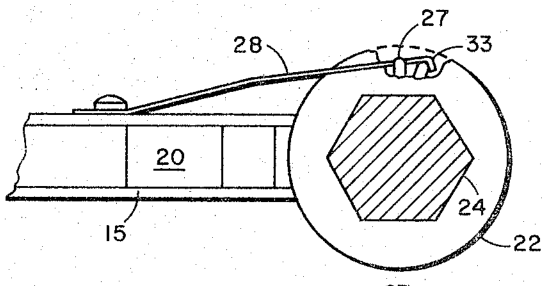
FIGURE 3 is a partial side view to illustrate one position of the indexing means.
Figure 4:
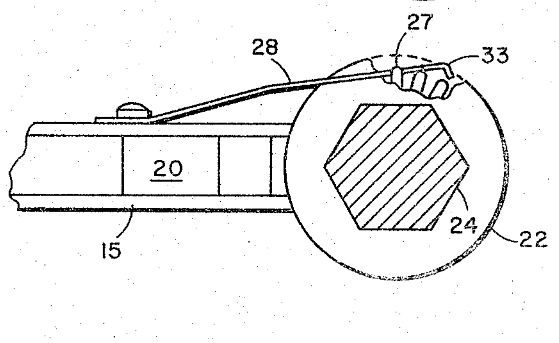
FIGURE 4 is a partial side view to show a second operational position of the indexing means.

The hub assembly 19 comprises preferably a pair of spaced discs 22 and 23 which are separated by a hub 24. The disc 22 includes a plurality of detents 26 arranged in a circular pattern which coact with a spring rod pin assembly 25 mounted in one arm of the slider 18 to form an accurate positioning means. The remaining disc 23 includes on its external surface a plurality of equally-spaced projections 27 arranged in a circular pattern as shown in FIGURES 3 and 4. The projections coact with a finger 28 mounted to the frame to form an indexing means.

Referring to FIGURE 2, it will be noted in particular that the hub is a polygon having edges of equal length. For purposes of this discussion, this type of configuration will be referred to as an equilateral polygon.

Figure 5:
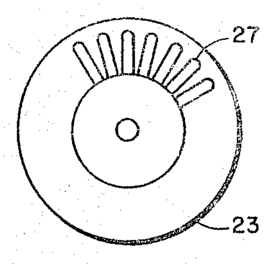
FIGURE 5 is a side view of an alternate construction of the hub assembly.

To facilitate manufacturing the hub assembly, it is preferably constructed as a casting with the detents 26 cast in the disc 22 and with radial projections 27, such as illustrated in FIGURE 5, cast into the face of disc 23. A spring 31 passes through the apertured pin 21 and is connected at each end to an actuating arm 12.

The operation of the surgical clip dispenser 10 may be described simply as follows: Initially, the finger 28 is positioned as indicated in FIGURE 3 over a projection 27. In this position it is possible to rotate the hub assembly in a counter-clockwise direction, but the projection 33 of the finger 28 prevents clockwise rotation of the hub assembly.

When the actuating arms are moved toward each other, the spring 31 tends to move toward the rear. In doing so, it moves the slider 18 toward the rear. The finger 28 moves into a position over the adjacent projection 27 to the front of it as indicated in FIGURE 4. The depression 33 rests against the projection 27 as indicated. When the actuating arms 12 are released to return to their original position, the spring moves the slider 18 forward. The depression 33 bearing against a projection 27 reacts to the sliding motion by rotating the disc in a counter-clockwise direction.

It is obvious that the detents 26 have the same angular spacing as the projections 27. Thus, as the hub assembly is rotated, accurate positioning of the hub is accomplished by means of the detent mechanism as described before.

Referring briefly to FIGURE 2, a clip-retaining wheel 41 is shown in phantom outline. Note that it contains a channel 42 which is terminated by a pair of angularly-spaced edges 43 and 44. The edges 43 and 44 are complementary to the configuration of the hub 24. An equilateral polygonal construction of the hub 24 makes it possible to mount the wheel 41 to the hub regardless of the orientation of the hub 24. It is merely necessary to construct the hub 24 of sufficient width to permit the edges 43 and 44 to mate with the hub 24.

It is clear that while a hexagonal polygon is illustrated in FIGURE 2, the configuration of the hub may take on the shape of any equilateral polygon having at least three sides, although the hexagonal configuration is preferred.

The improved clip dispenser depicted in the figures contains three principal parts, each of which is capable of being made in a low-cost casting operation. It is a highly reliable instrument which requires very little maintenance. It is easily recognized that the improved design makes it possible to provide only surgical clip retaining wheels in order to make the instrument fully operative. The wheel is disposable. The equilateral polygonal hub provides a fool-proof mechanism for properly maintaining the clip retaining wheel. There is no longer any need for orienting the wheel in a given direction.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. In a clip dispenser having a disposable clip holder on the periphery of which are mounted surgical clips that are normally sequentially dispensed, a rotatable hub suitable for mateably retaining said clip holder, and comprising an equilateral polygon, whereby said clip holder may be readily mounted on said hub regardless of the position of said hub.

2. In a clip dispenser as described in claim 1, said polygon includes an even number of sides.

3. In a clip dispenser having a disposable clip holder on the periphery of which are mounted surgical clips which are normally sequentially dispensed, a rotatable hub assembly suitable for mateably retaining said clip holder, and comprising a pair of spaced discs joined by a reduced diameter equilateral polygonal hub, wherein said clip holder may be readily mounted on said hub regardless of the position of said hub.

4. In a clip dispenser of the type described in claim 3, said discs are cylinders.

5. In a clip dispenser having a disposable clip holder on the periphery of which are mounted surgical clips which are normally sequentially dispensed by rotating said clip holder, a housing including one component of an indexing means for rotating a hub assembly for said clip holder; a rotatable hub assembly suitable for mateably retaining said clip holder, and comprising a pair of spaced discs joined by an equilateral polygonal hub, the exposed surface of one of said discs having second indexing component means which coact with said first component of said indexing means to rotate said hub, and wherein said clip holder may be readily mounted on said hub regardless of the position of said hub.

6. A surgical clip dispenser suitable for dispensing clips from a disposable clip holder, comprising:
(a) a frame including spaced actuating means for dispensing a clip from said disposable clip holder, and a slide holder positioned between said actuating means;
(b) a slide mounted to the slide holder and reciprocable with respect to the slide holder;
(c) means for reciprocating said slide in response to a manipulation of the actuating means; and
(d) a hub assembly rotatably mounted to the slide including an equilateral polygonal hub, whereby said disposable clip holder may be readily mounted on said hub regardless of the position of said hub.

7. A surgical clip dispenser suitable for dispensing surgical clips from a disposable clip holder, comprising:
(a) a frame including spaced actuating means and a slide holder positioned between said actuating means;
(b) a generally U-shaped slide mounted to the slide holder and reciprocable with respect to the slide holder;
(c) means for reciprocating said slide in response to a manipulation of the actuating means; and
(d) a hub assembly rotatably mounted at the open end of the slide including an equilateral polygonal hub, whereby said disposable clip holder may be readily mounted on said hub regardless of the position of said hub.

8. A surgical clip dispenser suitable for dispensing surgical clips from a disposable clip holder, comprising:
(a) a frame including spaced actuating means and a slide holder positioned between said actuating means;
(b) a slide mounted to the slide holder and reciprocable with respect to the slide holder;
(c) means for reciprocating said slide in response to a manipulation of the actuating means;
(d) a hub assembly rotatably mounted to the slide including an equilateral polygonal hub, said hub adapted for receipt of said clip holder regardless of the position of said hub; and
(e) indexing means responsive to a reciprocating movement of said slide to rotate said hub through a predetermined angle for dispensing said clips one at a time.

9. A surgical clip dispenser comprising:
(a) a frame including spaced actuating means and a slide holder positioned between said actuating means;
(b) a slide mounted to the slide holder and reciprocable with respect to the slide holder;
(c) means for reciprocating said slide in response to a manipulation of the actuating means;
(d) a hub assembly rotatably mounted to the slide comprising a pair of spaced cylindrical discs connected by an equilateral polygonal hub, one face of a disc containing a circular configuration of equally-spaced projections; and
(e) a finger mounted to the slide holder and engaging and coacting with the projections for rotating said hub assembly a predetermined amount in response to a reciprocating movement of said slide.

10. A surgical clip dispenser for dispensing surgical clips from a disposable clip holder, comprising:
(a) a frame including spaced actuating means and a slide holder positioned between said actuating means;
(b) a slide mounted to the slide holder and reciprocable with respect to the slide holder;
(c) means comprising a spring joined to said actuating means and said slider and actuated by said actuating means for reciprocating said slide in response to a manipulation of the actuating means;
(d) a hub assembly rotatably mounted to the slide including an equilateral polygonal hub, whereby said disposable clip holder may be readily mounted on said equilateral polygonal hub regardless of the position of said hub.

References Cited by the Examiner

UNITED STATES PATENTS

| | | | |
|---|---|---|---|
| 1,880,569 | 10/1932 | Weis | 72—410 |
| 3,075,199 | 1/1963 | Rose et al. | 72—410 |

CHARLES W. LANHAM, *Primary Examiner.*

RONALD D. GREFE, *Assistant Examiner.*